(12) United States Patent
Shioiri

(10) Patent No.: US 6,619,151 B2
(45) Date of Patent: Sep. 16, 2003

(54) TRANSMISSION

(75) Inventor: Hiroyuki Shioiri, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/921,434

(22) Filed: Aug. 2, 2001

(65) Prior Publication Data

US 2002/0014131 A1 Feb. 7, 2002

(30) Foreign Application Priority Data

Aug. 3, 2000 (JP) ........................................ 2000-236219

(51) Int. Cl.[7] ................................................ F16H 3/10
(52) U.S. Cl. ............................ 74/333; 192/44; 74/337
(58) Field of Search ............................ 74/333, 336 R, 74/337; 192/38, 44, 45

(56) References Cited

U.S. PATENT DOCUMENTS

| 3,949,848 | A | * | 4/1976 | Fogelber ...................... 192/38 |
| 4,111,288 | A | * | 9/1978 | Fogelberg ..................... 192/38 |
| 4,817,451 | A | * | 4/1989 | Weismann ..................... 74/333 |
| 5,131,285 | A | * | 7/1992 | Weismann et al. ............ 74/333 |
| 5,297,450 | A | * | 3/1994 | MacPherson ................. 74/333 |
| 5,419,419 | A | * | 5/1995 | Macpherson ................. 74/333 |

FOREIGN PATENT DOCUMENTS

| JP | 9-25942 | 1/1997 |
| JP | 10-47391 | 2/1998 |

* cited by examiner

Primary Examiner—Ankur Parekh
(74) Attorney, Agent, or Firm—Kenyon & Kenyon

(57) ABSTRACT

A transmission comprising: an input shaft, to which a power is transmitted from a prime mover; an output shaft for outputting the power to drive wheels; and a plurality of transmission mechanisms of different gear ratios for transmitting the power between the input shaft and the output shaft. A two-way clutch capable of switching a torque transmitting direction into a forward direction and a backward direction is interposed between at least any of the transmission mechanisms and the input shaft or the output shaft, and a select mechanism is provided for selecting the torque transmitting direction of the two-way clutch.

16 Claims, 6 Drawing Sheets

FIG.4A (AT DRIVING TIME)

| | POSITIONS OF RETAINERS/ROLLERS | | | | | | | |
|---|---|---|---|---|---|---|---|---|
| | 10 FOR 1ST SPEED | | 11 FOR 2ND SPEED | | 12 FOR 3RD SPEED | | 13 FOR 4TH SPEED | |
| | − | + | − | + | − | + | − | + |
| 1st | | ● | ○ | | | ○ | | ○ |
| 2nd | | ○ | | ● | ○ | | | ○ |
| 3rd | | ○ | | ○ | | ● | | ○ |
| 4th | | ○ | | ○ | | ○ | ● | |

FIG.4B (AT DRIVEN TIME)

| | POSITIONS OF RETAINERS/ROLLERS | | | | | | | |
|---|---|---|---|---|---|---|---|---|
| | 10 FOR 1ST SPEED | | 11 FOR 2ND SPEED | | 12 FOR 3RD SPEED | | 13 FOR 4TH SPEED | |
| | − | + | − | + | − | + | − | + |
| 1st | ● | | | ○ | | ○ | | ○ |
| 2nd | | ○ | ● | | | ○ | | ○ |
| 3rd | | ○ | | ○ | ● | | | ○ |
| 4th | | ○ | | ○ | | ○ | | ● |

(A)

(B)

FIG.8
| | 3RD TWO-WAY CLUTCH 33C | | 2ND TWO-WAY CLUTCH 33B | | 1ST TWO-WAY CLUTCH 33A | |
|---|---|---|---|---|---|---|
| | RETAINER ROLLERS | OUTER RING | RETAINER ROLLERS | OUTER RING | RETAINER ROLLERS | OUTER RING |
| 1st | B | 2nd | B | 3rd | F | 1st |
| 2nd | F | 2nd | B | 3rd | F | 1st |
| 3rd | F | 2nd | F | 3rd | B | 4th |
| 4th | B | 5th | F | 3rd | F | 4th |
| 5th | F | 5th | B | 6th | F | 4th |
| 6th | F | 5th | F | 6th | F | 4th |
FIG.9A
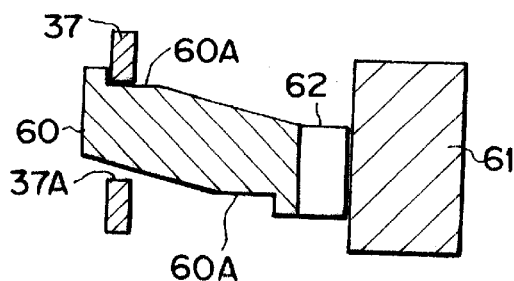
FIG.9B
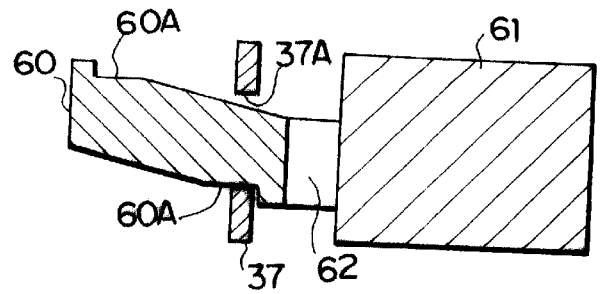

TRANSMISSION

BACKGROUND OF THE INVENTION

1. Field of the Invention

The present invention relates to a transmission capable of setting a plurality of gear ratios selectively.

2. Related Art

As a transmission for a vehicle, there is known either an automatic transmission for switching the applied/released states of engagement devices such as clutches or brakes by judging the gear ratio on the basis of the running state of the vehicle so that the gear ratio may be achieved, or a manual transmission for setting a predetermined gear stage by selecting a plurality of gear pairs always meshing with each other on the basis of a manual operation to connect the selected gear pairs to an input shaft or an output shaft. According to the most general structure of the former automatic transmission, a gear mechanism is constructed of a plurality of sets of planetary gear mechanisms so that the power transmission line of the gear mechanism may be changed to execute a gear change by applying an oil pressure to a predetermined engagement device to bring it into engagement and by discharging the oil pressure from another engagement device to release it. According to a general structure of the latter manual transmission, on the other hand, the gear pair to participate in the torque transmission is selected by applying/releasing a synchronous coupling mechanism (or a synchronizer) with a shift fork associated with a shift lever. In the prior art, there is known the so-called "semiautomatic" transmission for executing the gear change by activating an actuator capable of controlling the synchronizer in the manual transmission electrically.

In the automatic transmission of the prior art thus far described, the engagement devices such as clutches or brakes to be hydraulically applied take direct participation in the torque transmission, so that they have to be reliably applied for keeping a predetermined gear ratio. For keeping the gear ratio, therefore, it is necessary to establish an oil pressure necessary and sufficient at all times for keeping the engagement devices in the applied states. Therefore, the pump power for establishing the oil pressure is a power loss of the vehicle as a whole and is a cause for deteriorating the fuel economy.

In either the manual transmission in which the gear pairs to participate in the torque transmission are selected by the manual operation or the semiautomatic transmission in which the selections are carried out by actuators, on the contrary, no manipulation force is required after the synchronizer was switched, to eliminate the disadvantage of the power loss in the above-mentioned automatic transmission. In the transmission of this kind, however, the gear change has to be executed with the input of the power to the transmission being interrupted. Therefore, the interruption of the power and the later input of the power are consecutively caused at each gear change. As a result, shift shocks may appear to deteriorate the riding comfort and the drivability.

SUMMARY OF THE INVENTION

A main object of the invention is to provide a transmission which has no power interruption at a gear change but requires no power for keeping a gear ratio.

The invention is characterized by making a construction in which such one of a plurality of transmission mechanisms interposed between a first shaft and a second shaft and having different gear ratios as participates in the transmission of a torque is selected by actuating a two-way clutch. According to the invention, more specifically, there is provided a transmission comprising: a first shaft, to which a power is transmitted from a prime mover; a second shaft for outputting the power to drive wheels; and a plurality of transmission mechanisms of different gear ratios for transmitting the power between said first shaft and said second shaft. Moreover, the transmission according to the invention is characterized: in that a two-way clutch capable of switching a torque transmitting direction into a forward direction and a backward direction is interposed between at least any of said transmission mechanisms and said first shaft or said second shaft; and in that select means is provided for selecting the torque transmitting direction of said two-way clutch.

In the invention, therefore, the two-way clutch for a predetermined transmission mechanism is set in a state to transmit the torque forward. If an upshift is effected from that state, that is, if the torque is transmitted between the first shaft and the second shaft through a transmission mechanism having a small gear ratio, the two-way clutch being applied is released in response to a change in the torque to establish the gear change. Specifically, the gear change is achieved by the change in the torque so that the power is not interrupted. Moreover, the two-way clutch keeps the applied states according to the acting direction of the torque, so that no power is consumed to keep the gear ratio.

In the invention, on the other hand, there can be adopted as said two-way clutch, a two-way clutch constructed to retain a transmission member, which is arranged between an inner ring and an outer ring for intermediating the torque transmission between said inner ring and said outer ring, by a retainer, and to turn said retainer relative to said inner ring or said outer ring thereby to switch the torque transmitting direction, and said select mechanism can include a change-over mechanism for moving axially to turn said retainer relative to said inner ring or said outer ring.

With this construction, therefore, said change-over mechanism moves forward or backward to turn the retainer by a predetermined angle. As a result, the torque transmitting direction in the two-way clutch is changed to achieve the gear change. This movement in the axial directions is similar to that for switching the synchronizer in the manual transmission or semiautomatic transmission of the prior art, so that the mechanism of the prior art for switching the synchronizer can be converted as the mechanism for operating the gear change. As a result, it is possible to lower the cost for manufacturing the transmission.

In the invention, moreover, said change-over mechanism can include: a movable member for moving said retainer to a position for transmitting the torque forward and a position for transmitting the torque backward; and a detent mechanism for retaining said movable member selectively in a first position to retain said retainer in said position for transmitting the torque forward and in a second position to retain said retainer in said position for transmitting the torque backward.

According to this construction, therefore, the retainer in the two-way clutch transmitting the torque, turns together with the inner ring and the outer ring, but the member for applying a manipulation force in the axial directions for turning the retainer with respect to the inner ring or the outer ring is stopped in the turning direction. As a result, relative rotations occur between the two-way clutch and that member. However, the movable member coupled to the retainer is retained in the first position and in the second position by the detent mechanism. Accordingly, the retainer is retained in the position for transmitting the torque forward and in the position for transmitting the torque backward. As a result, no manipulation force need not be continuously applied after the retainer was set in either position, so that the frictional contact between the movable member and the member for moving the former axially can be avoided.

In the invention, moreover, the transmission can further comprise: a selective coupling mechanism for coupling/ decoupling said two-way clutch and said transmission mechanisms selectively.

With this construction, therefore, a predetermined two-way clutch is selectively coupled to the transmission mechanisms through the selective coupling mechanism so that it participates in the torque transmission through the transmission mechanisms. Therefore, one two-way clutch can be shared among the transmission mechanisms so that the number of required two-way clutches can be reduced with respect to the number of transmission mechanisms, i.e., the number of gear ratios to be set.

In the invention, still moreover, said change-over mechanism can include a member made movable in the axial directions for moving said retainer to the position for transmitting the torque forward and the position for transmitting the torque backward, and said movable member can have a retaining face on which the load to be received from said retainer is in parallel with the tangential direction of said retainer when said retainer is retained in any of said positions.

In the invention, therefore, as the movable member moves back and forth in the axial directions, the retainer turns by a predetermined angle with respect to the inner ring or the outer ring thereby to change the torque transmitting direction by the two-way clutch. In the retainer set to have the torque transmitting direction in the predetermined direction, a load is established in the direction to turn the retainer relative to the inner ring or the outer ring and is transmitted to the movable member. However, the retaining face of the movable member for receiving the load from the retainer is a face opposed to the direction parallel to the tangential direction of the retainer, i.e., a face along the directions in parallel with the axial directions. Therefore, the load to move the movable member axially is not established. Without any continuous application of the manipulation force to the movable member, more specifically, the retainer can be retained in a predetermined position of the torque transmitting direction.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 4A is a diagram tabulating the positions of retainers and rollers for setting the individual gear stages in a driving state;

FIG. 4B is a diagram tabulating the positions of retainers and rollers for setting the individual gear stages in a driven state;

FIG. 8 is a diagram tabulating the positions of retainers and rollers for setting the individual gear stages in the transmission of FIG. 7 and the positions of a selective coupling mechanism;

FIG. 9A is a schematic diagram showing an example of a movable member for moving and fixing a retainer and a roller to and at predetermined positions; and FIG. 9B is a schematic diagram showing the movable member in another active state.

DETAILED DESCRIPTION OF THE PREFERRED EMBODIMENT

Figure 1:
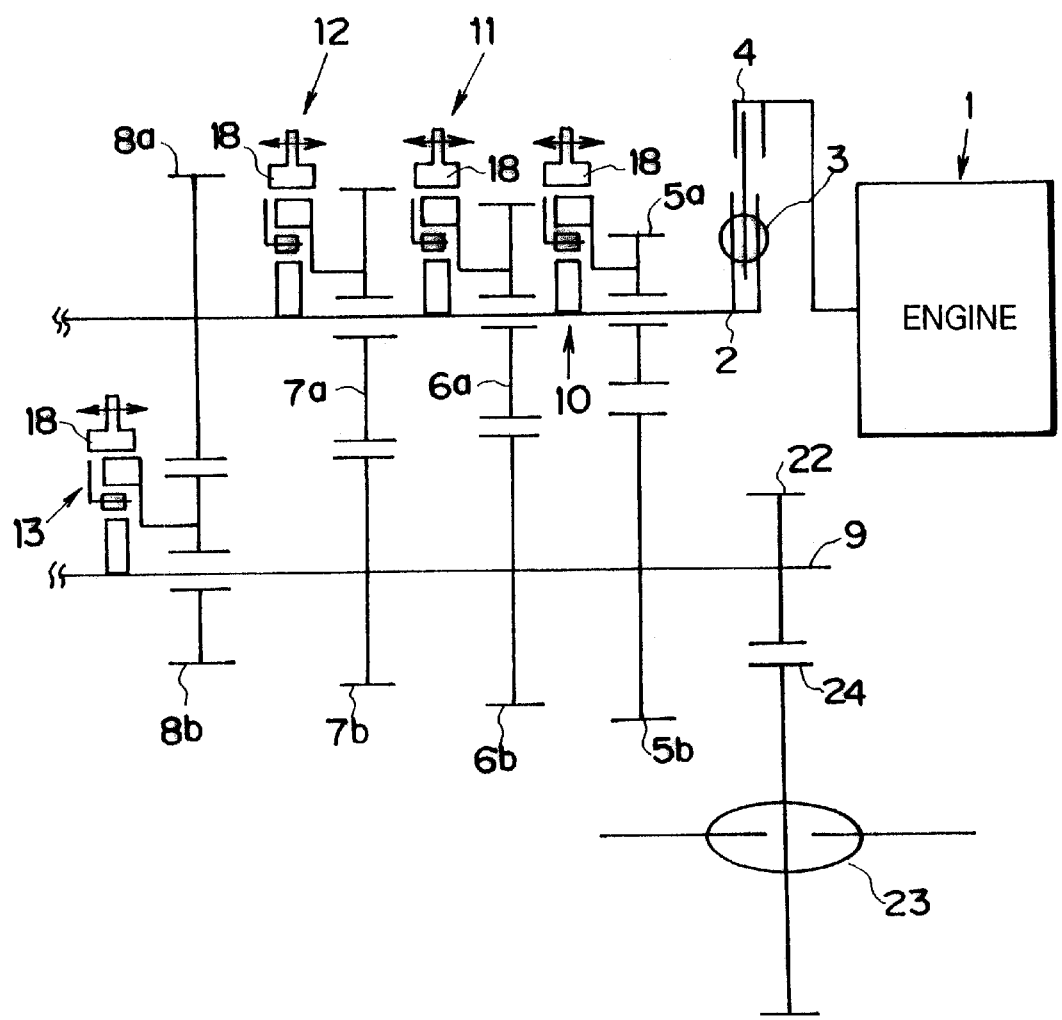
FIG. 1 is a skeleton diagram showing one embodiment of a transmission according to the invention.

The invention will be described in connection with its specific embodiments. An embodiment shown in FIG. 1 is enabled to set four forward gear stages. From FIG. 1, there is omitted a structure for setting a reverse stage. On the common axis of an engine 1 exemplifying a prime mover, as shown in FIG. 1, there is arranged an input shaft 2. Between the engine 1 and input shaft 2, there is interposed a start clutch 4 having a damper 3. This start clutch 4 is a clutch such as a dry type clutch for effecting a smooth start by gradually increasing a frictional force to increase gradually the torque transmitted from the engine 1 to the input shaft 2.

On the input shaft 2, there are so mounted a 1st-speed drive gear 5a, a 2nd-speed drive gear 6a and a 3rd-speed drive gear 7a as can rotate relative to one another. A 4th-speed drive gear 8a is also mounted to rotate integrally with the input shaft 2. In parallel with this input shaft 2, there is rotatably arranged an output shaft 9. On this output shaft 9, the followings are mounted rotatably with the output shaft 9: a 1st-speed driven gear 5b meshing with the 1st-speed drive gear 5a; a 2nd-speed driven gear 6b meshing with the 2nd-speed drive gear 6a; and a 3rd-speed driven gear 7b meshing with the 3rd-speed drive gear 7a. On the output shaft 9, on the other hand, there is rotatably mounted a 4th-speed driven gear 8b which meshes with the 4th-speed drive gear 8a.

The 1st-speed to 4th-speed drive gears 5a, 6a, 7a and 8a and driven gears 5b, 6b, 7b and 8b, as meshing with each other, construct transmission mechanisms for setting the individual gear stages. The gear ratios of these transmission mechanisms, i.e., the gear pairs are different from one another. Specifically, the gear ratio of the 1st-speed drive gear 5a and driven gear 5b is the largest, and the gear ratios between the drive gears 6a, 7a and 8a and the driven gears 6b, 7b and 8b are sequentially reduced for the 2nd-speed, 3rd-speed and 4th-speed.

In order to couple those transmission mechanisms individually to the input shaft 2 or the output shaft 9, there are provided two-way clutches. Between the 1st-speed drive gear 5a and the input shaft 2, between the 2nd-speed drive gear 6a and the input shaft 2, between the 3rd-speed drive gear 7a and the input shaft 2 and between the 4th-speed driven gear 8b and the output shaft 9, respectively, there are interposed two-way clutches 10, 11, 12 and 13. These two-way clutches 10, 11, 12 and 13 are the torque transmission mechanisms which are enabled to switch the torque transmitting directions forward and backward and constructed to run idly in the opposition of the torque transmitting direction set, as schematically shown in FIG. 2.

Figure 2:
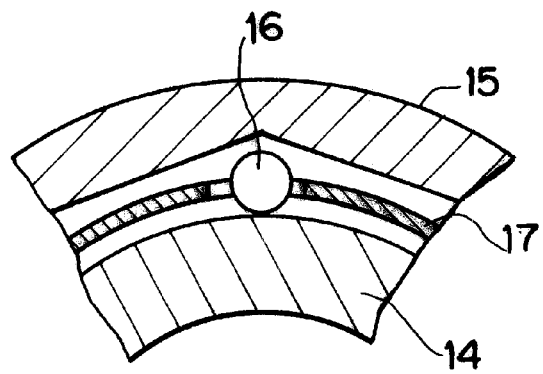
FIG. 2 is a partial front view showing a portion of a two-way clutch to be used in the transmission.

In FIG. 2, an inner ring 14 and an outer ring 15 are arranged on concentric circles, and a plurality of rollers 16 are arranged as transmission members between the outer circumference of the inner ring 14 and the inner circumference of the outer ring 15. Moreover, these rollers 16 are so retained by a retainer 17, or a ring-shaped member, as to keep a predetermined spacing. Of the inner circumference of the outer ring 15, the portions enveloping the individual rollers 16 are formed of two planes which are angularly folded in the circumferential direction. Therefore, the both side portions, as interposing each roller 16, in the circumferential direction define such clearances as become gradually the smaller in radial sizes as they leave the roller 16 the farther. In other words, each two-way clutch 10, 11, 12 or 13 establishes the torque transmission between the inner ring 14 and the outer ring 15 in the direction where it clamps the roller 16 positively in the clearance.

In FIG. 2, more specifically, the retainer 17 is turned clockwise and relatively with respect to the outer ring 15 to bring the roller 16 into the clearance on the righthand side of FIG. 2. If the inner ring 14 is to rotate clockwise, the roller 16 is positively clamped between the inner ring 14 and the outer ring 15 so that the torque is transmitted between the inner ring 14 and the outer ring 15. If the retainer 17 is relatively turned counter-clockwise of FIG. 2 with respect to the outer ring 15, on the contrary, the torque is transmitted between the inner ring 14 and the outer ring 15 as the inner ring 14 rotates counter-clockwise of FIG. 2 with respect to the outer ring 15. Here, if the roller 16 is retained at an intermediate position between the positions for transmitting the torque in each of the directions, the transmission of the torque between the inner ring 14 and the outer ring 15 can be interrupted.

Figure 3:
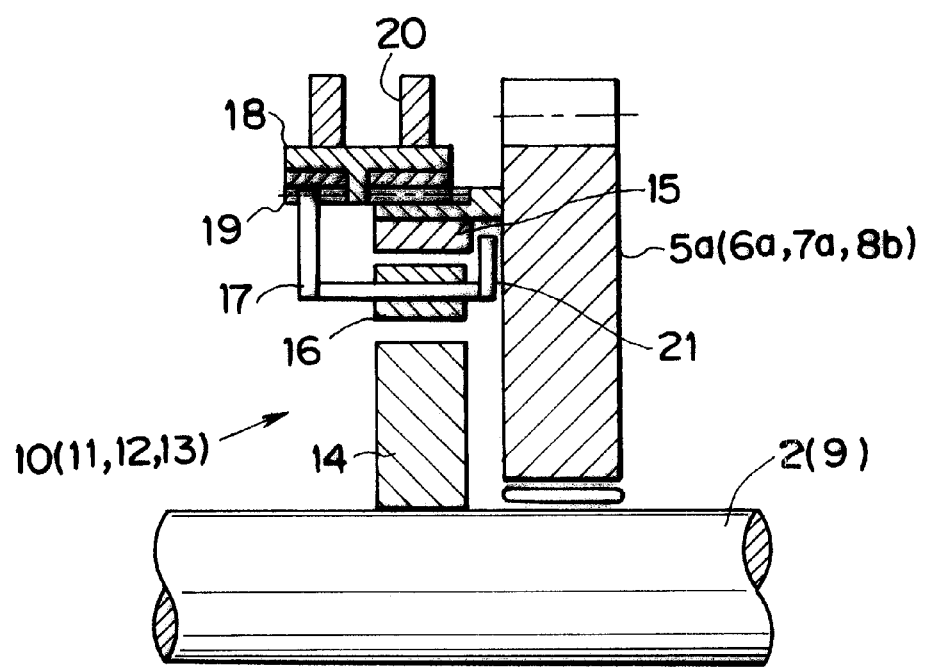
FIG. 3 is a sectional diagram schematically showing one example of a select mechanism for switching a torque transmitting direction in the two-way clutch.

In FIG. 3, there is shown one example of a mechanism for turning relatively each retainer 17 in each of the two-way clutches 10, 11, 12 and 13 with respect to the outer ring 15. The inner ring 14 is so mounted on the input shaft 2 or the output shaft 9 as to rotate integrally therewith, and the outer ring 15 is integrated with the gear 5a (or 6a, 7a or 8b) which is rotatably mounted on that shaft 2 (or 9). On the outer circumference of the outer ring 15, there is mounted a sleeve 18 through a spline formed in the axial direction. This sleeve 18 is protruded oppositely of the gear 5a (or 6a, 7a or 8b) with respect to the outer ring 15. A helical gear 19 is formed in the inner circumference of the protruded end portion of the sleeve 18. And, the retainer 17 has a portion extending axially and radially, and this extending leading end portion meshes relatively movably with the helical gear 19. Moreover, the sleeve 18 is provided on its outer circumference with an engagement portion 20, with which the not-shown manipulation member such as the shift fork engages.

In the mechanism shown in FIG. 3, therefore, the retainer 17 is rotated relatively by the angle of inclination of the helical gear 19 and by the angle corresponding to the stroke of the sleeve 18 with respect to the outer ring 15 by the action of the helical gear 19, as the sleeve 18 is moved in the axial directions. Here in FIG. 3, reference numeral 21 designates a stopper mechanism, by which the axial movements of the retainer 17 are restricted.

To the end portion, as opposed to the end portion carrying the two-way clutch 13, of the output shaft 9, i.e., to the end portion closer to the engine 1, there is mounted an output gear 22, which meshes with a ring gear 24 of a differential 23.

Here will be described the actions of the transmission shown in FIG. 1. In FIGS. 4A and 4B, there are enumerated the positions of the retainer 17 in the individual two-way clutches 10, 11, 12 and 13 for setting the individual gear stages. Here in FIGS. 4A and 4B, symbol "+" indicates the position of the retainer 17 for transmitting the torque in the rotating direction for the forward runs from a member on the drive side (i.e., the inner ring 14 in the 1st-speed to 3rd-speed two-way clutches 10, 11 and 12, and the outer ring 15 in the 4th-speed two-way clutch 13) to a member on the driven side (i.e., the outer ring 15 in the 1st-speed to 3rd-speed two-way clutches 10, 11 and 12, and the inner ring 14 in the 4th-speed two-way clutch 13). On the contrary, symbol "−" indicates the position of the retainer 17 for transmitting the torque in the rotating direction for the forward runs from a member on the driven side (i.e., the outer ring 15 in the 1st-speed to 3rd-speed two-way clutches 10, 11 and 12, and the inner ring 14 in the 4th-speed two-way clutch 13) to a member on the drive side (i.e., the inner ring 14 in the 1st-speed to 3rd-speed two-way clutches 10, 11 and 12, and the outer ring 15 in the 4th-speed two-way clutch 13). For example, the position of the retainer 17 for displacing the rollers 16 rightward from the position shown in FIG. 2 is indicated by "+", and the position of the retainer 17 for displacing the rollers 16 leftward from the position shown in FIG. 2 is indicated by "−". On the other hand, symbol "●" indicates that the torque is being transmitted, and symbol "○" indicates that the torque is not transmitted to establish a relative idle rotation between the inner ring and the outer ring. Here, FIG. 4A tabulates the state at a driving time when the vehicle runs with the driving force of the engine 1, and FIG. 4B tabulates the state at a driven time when the engine 1 is forcibly rotated by the vehicle.

First of all, the start clutch 4 is released when the engine 1 is to be started. When the vehicle is started at the 1st speed after the start of the engine 1, the retainer 17 and the rollers 16 of the 1st-speed two-way clutch 10 are set at the "+" position for transmitting the torque in the forward direction, and the retainers 17 and the rollers 16 of the remaining two-way clutches 11, 12 and 13 are set at the positions for transmitting no torque in the forward direction. Specifically, the retainers 17 and the rollers 16 are set at the "−" position for the 2nd-speed two-way clutch 11 and the 3rd-speed two-way clutch 12 and at the "+" position for the 4th-speed two-way clutch 13. These settings are carried out by moving the sleeve 18 in the axial directions. After the individual two-way clutches 10, 11, 12 and 13 were thus set, the start clutch 4 is gradually applied to increase its transmission torque gradually. In short, there is performed the so-called "friction start".

In this case, the 1st-speed drive gear 5a is to be stopped by a load applied from the output shaft 9, but the input shaft 2 and the inner ring 14 integral with the former rotate forward. Therefore, the inner ring 14 rotates forward with respect to the outer ring 15 integral with the 1st-speed drive gear 5a, so that the rollers 16 acting as the transmission members are clamped in-between to transmit the torque. As a result, the torque is transmitted through the 1st-speed drive gear 5a and the 1st-speed driven gear 5b from the input shaft 2 to the output shaft 9 thereby to set the 1st speed according to the gear ratio between those gears 5a and 5b.

In this state of the 1st speed, too, there engage the drive gears 6a, 7a and 8a and the driven gears 6b, 7b and 8b of the remaining pairs so that these gears rotate. However, the gear ratios of the gear pairs for the 2nd speed and the 3rd speed are smaller than that for the 1st gear so that the inner rings 14 in the individual two-way clutches 11 and 12 rotate forward relative to the outer rings 15. Since the retainer 17 and the rollers 16 are set at the position "−" where the torque is not transmitted in the forward rotation, however, the torque is not transmitted between the inner ring 14 and the outer ring 15. In the 4th-speed two-way clutch 13, on the other hand, the outer ring 15 acts as the drive side member, and the inner ring 14 acts as the driven side member, so that the outer ring 15 rotates forward relative to the inner ring 14. However, the retainer 17 and the rollers 16 are set at the position "+" where the torque is not transmitted in the forward direction, so that the outer ring 15 rotates idly relative to the inner ring 14.

In the state of the 1st speed, the retainer 17 and the rollers 16 in the 2nd-speed two-way clutch 11 are moved from the position "−" to the position "+". Then, the inner ring 14 is rotating forward relative to the outer ring 15 so that the rollers 16 are clamped between the inner ring 14 and the outer ring 15. As a result, the torque is gradually transmitted from the inner ring 14 to the outer ring 15. As the torque to be transmitted by the 2nd-speed two-way clutch 11 increases, the rotating speed of the input shaft 2 gradually drops. As a result, in the 1st-speed two-way clutch 10, the torque to be transmitted from the inner ring 14 to the outer ring 15 is gradually decreased to zero. After this, the inner ring 14 starts to rotate backward relative to the outer ring 15. Specifically, the 1st-speed two-way clutch 10 is automatically released according to the change in the acting direction of the torque thereby to set the 2nd speed according to the gear ratio between the 2nd-speed drive gear 6a and the 2nd-speed driven gear 6b. This setting is effected as a result that the torque is transmitted in the 2nd-speed two-way clutch 11. Therefore, a gear change from the 1st speed to the 2nd speed is caused without any interruption of the power.

In the case of a gear change from the 2nd speed to the 3rd speed, on the other hand, the positions of the retainer 17 and the rollers 16 in the 3rd-speed two-way clutch 12 are switched in the state of the 2nd speed from the position "−" to the position "+". Then, the torque is transmitted through the 3rd-speed two-way clutch 12 so that the 2nd-speed two-way clutch 11 is gradually released. In the case of a gear change from the 3rd speed to the 4th speed, moreover, the positions of the retainer 17 and the rollers 16 in the 4th-speed two-way clutch 13 are switched in the state of the 3rd speed from the position "−" to the position "+". Then, the torque is transmitted through the 4th-speed two-way clutch 13 so that the 3rd-speed two-way clutch 12 is gradually released. Therefore, either of these gear changes can be caused without any interruption of the power.

When the so-called "engine brake" is effected in the driven state where the torque is inputted from the output gear 22, on the other hand, the positions of the retainer 17 and the rollers 16 in the two-way clutch transmitting the torque at that instant are reversed. In the state of the 4th speed, more specifically, the retainer 17 and the rollers 16 in the 4th-speed two-way clutch 13 are switched from the position "−" to the position "+". In the case of the 3rd speed, the 2nd speed or the 1st speed, the retainers 17 and the rollers 16 of the two-way clutches 12, 11 and 10 participating in the torque transmission are switched from the position "+" to the position "−". This state is tabulated in FIG. 4B.

More specifically, the driven state is established at the 4th speed. When the retainer 17 and the rollers 16 of the 4th-speed two-way clutch 13 are switched to the position "+" so as to effect the engine brake, the output shaft 9 and the inner ring 14 integral with the former rotate forward with respect to the outer ring 15 integral with the 4th-speed driven gear 8b. Therefore, the retainer 17 and the rollers 16 retained by the former are set to the position "+". As a result, the rollers 16 are clamped between the inner ring 14 and the outer ring 15 to transmit the torque so that the 4th-speed driven gear 8b, the 4th-speed drive gear 8a and the input shaft 2 are forcibly rotated. In the remaining two-way clutches 10, 11 and 12, the outer rings 15 integral with the drive gears 5a, 6a and 7a rotate forward at high speeds with respect to the inner rings 14, that is, the inner rings 14 rotate relatively and backward with respect to the outer rings 15. Therefore, the torque is not transmitted even if the retainers 17 and the rollers 16 are set at the position "+".

These situations are similar in any of the cases where the engine brake is effected at the 3rd speed, where the engine brake is effected at the 2nd speed and where the engine brake is effected at the 1st speed. By reversing the positions of the retainers 17 of the two-way clutches having transmitting the torque in the drive states at the individual gear stages, one two-way clutch transmits the torque in the driven state, but the remaining two-way clutches are released.

Here, as tabulated in FIG. 4B, the positions of the retainer 17 and the rollers 16 of each two-way clutch for effecting the engine brake in the driven state are identical to those for setting a gear stage lower by one speed in the drive state. When the driven state is established by returning the (not-shown) accelerator pedal while the vehicle is running in the drive state with a predetermined gear stage being set, therefore, the engine brake becomes effective after an upshift. As a result, it is possible to avoid an abrupt activation of engine brake instantly after the accelerator pedal is released, and accordingly the so-called "jerky feel".

In the transmission shown in FIG. 1, the torque at each gear stage is transmitted through the two-way clutch, but no oil pressure is required for keeping the torque transmitting state. Unlike the automatic transmission of the prior art, therefore, it is possible to avoid the power loss which might otherwise be caused by driving the hydraulic pump. Moreover, the gear change can be executed without any interruption of the power. It is, therefore, possible to achieve the gear changing characteristics similar to those of the automatic transmission of the prior art while reducing the power loss as in the manual transmission of the prior art.

The transmission thus far described is constructed to execute the gear changes by moving the sleeve 18 in the axial directions. Therefore, the sleeve 18 rotates together with the corresponding two-way clutch, but the shift fork or a similar member for moving the sleeve 18 axially does not rotate. When the sleeve 18 is retained at the forward position or the reverse position, therefore, there arises a slip between the sleeve 18 and the member for moving it back and forth. A mechanism for eliminating that slip is shown in FIGS. 5A and 5B.

Figure 5A:
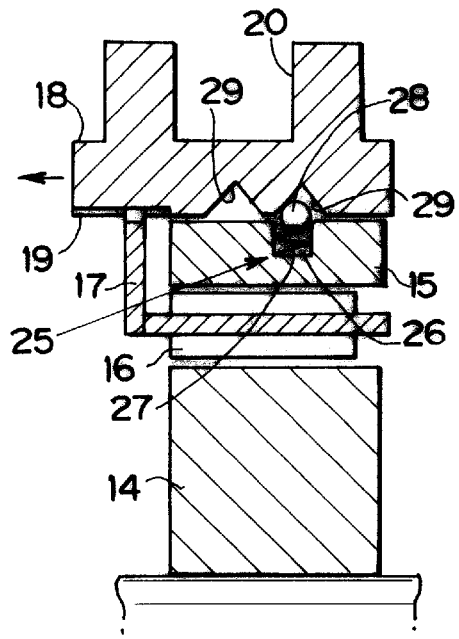
FIG. 5A is a schematic diagram showing one example of a detent mechanism.
Figure 5B:
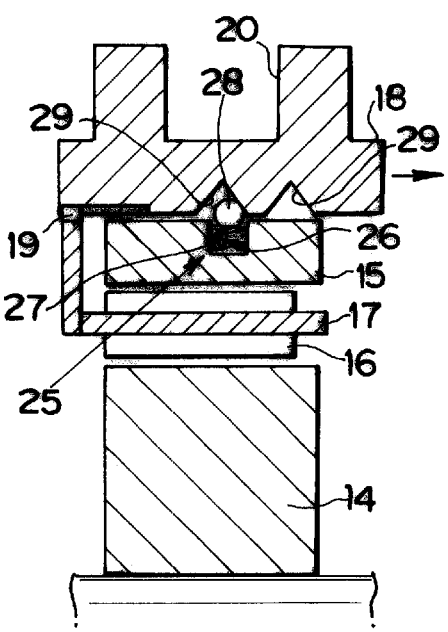
FIG. 5B is a schematic diagram showing the detent mechanism in another active state.

In the example shown in FIGS. 5A and 5B, more specifically, a detent mechanism 25 is interposed between the sleeve 18 and the outer ring 15. In the outer circumference of the outer ring 15, there is opened a recess 26, in which there are fitted an elastic member 27 such as a spring and an engagement member 28 such as a spherical member. This engagement member 28 is urged radially outward by the elastic member 27. At two axial positions in the inner circumference of the sleeve 18, on the other hand, there are formed recesses 29, in which the engagement member 28 is to be fitted. These recesses 29 have two slopes on the both sides in the axial directions and are so positioned that the engagement member 28 is fitted in one recess 29 when the sleeve 18 moves to set the retainer 17 in the position "+" and that the engagement member 28 is fitted in the other recess 29 when the sleeve 18 moves to set the retainer 17 in the position "−".

When the sleeve 18 is moved leftward to the position shown in FIG. 5A, therefore, the engagement member 28 is pushed onto the slope of the recess 29 on the side of the sleeve 18 by the elastic force of the elastic member 27. As a result, the sleeve 18 is further pushed leftward so that it is retained at the position where the engagement member 28 engages completely with the recess 29. Until the engagement member 28 engages completely with the recess 29 from the state shown in FIG. 5A, therefore, the sleeve 18 is moved by the elastic force of the elastic member 27 so that the sleeve 18 is set free from the manipulation member such as the shift fork for moving the sleeve 18 axially.

A similar discussion applies to the case in which the sleeve 18 is moved in the opposite direction. When the sleeve 18 is moved to the position shown in FIG. 5B by the not-shown manipulation member, the engagement member 28 being pushed by the elastic member 27 is pushed onto the slope of the other recess 29. Since then, therefore, the sleeve 18 is moved rightward of FIG. 5B by the elastic force of the elastic member 27. As a result, the sleeve 18 is freed from the manipulation member at the instant when the engagement member 28 engages completely with the recess 29.

When the engagement member 28 is thus completely fitted in either recess 29, the sleeve 18 is retained in the position. Without retaining the sleeve 18 in the predetermined position by the manipulation member such as the shift fork, more specifically, the sleeve 18 can be so fixed that the retainer 17 and the rollers 16 may be positioned in the position "+" and the position "−", thereby to prevent the two-way clutches 10, 11, 12 and 13 reliably from being released by the disturbances. It is also possible to prevent the slip between the manipulation member and the sleeve 18 and accordingly the friction or wear, as might otherwise be caused by the slip.

Figure 6:
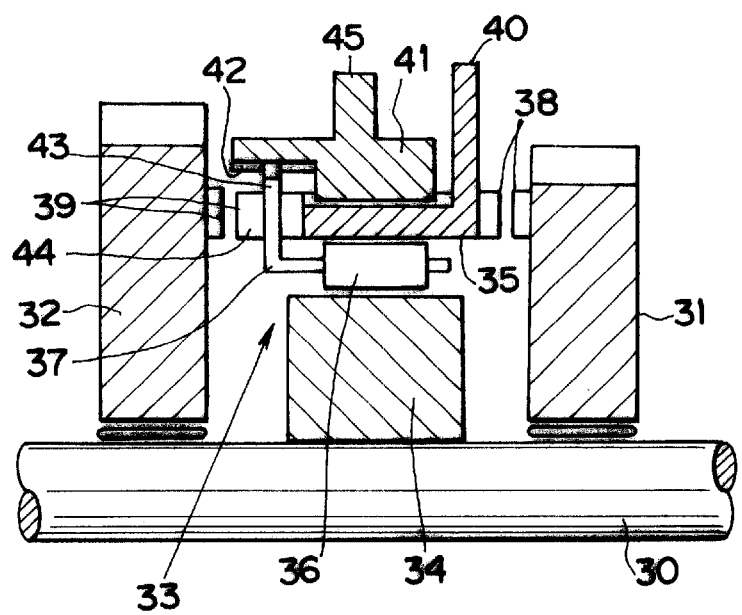
FIG. 6 is a diagram schematically showing one example of a selective coupling mechanism of the case in which one two-way clutch is shared between two transmission mechanisms.

In the embodiment thus far described with reference to FIG. 1, each of the gear pairs is provided with the two-way clutch. Alternatively, the invention can be modified in construction to share one two-way clutch between two gear pairs, as shown in FIG. 6. This modification is exemplified by a mechanism in which one two-way clutch is shared between two gear pairs. Between two gears 31 and 32 fitted rotatably on a shaft 30, there is arranged a two-way clutch 33, in which the inner ring 34 is so mounted on the shaft as to rotate together. An outer ring 35 is arranged on a concentric circle of the inner ring 34. Between the inner circumference of the outer ring 35 and the outer circumference of the inner ring 34, there are arranged a plurality of rollers 36 acting as transmission members, which are retained at a predetermined interval by a retainer 37 and can rotate relative to the outer ring 35 in the retained state. Here, this construction composed of the inner ring 34, the outer ring 35, the rollers 36 and the retainer 37 is similar to the aforementioned one for the two-way clutches 10, 11, 12 and 13.

On the other hand, the outer ring 35 of the two-way clutch 33 shown in FIG. 6 is made movable in the axial directions, and its two axial end portions are close to the side faces of the right and left gears 31 and 32. Positive clutches 38 and 39 for meshing with each other to transmit the torque are mounted on the end portions of the outer ring 35 and the opposed side faces of the gears 31 and 32. Moreover, a flange portion 40 acting as a manipulation portion for moving the outer ring 35 back and forth in the axial directions is formed to extend from the outer ring 35 outward in the axial directions. Here, the positive clutches 38 and 39 are formed on the two end portions of the outer ring 35. Alternatively, there may be provided another cylindrical member which can rotate integrally with the outer ring 35 and can move in the axial directions, and the positive clutches 38 and 39 may be mounted on the two axial end portions of that cylindrical member. In this modification, the flange portion is integrated with the cylindrical member.

Around the outer circumference of the outer ring 35, there is mounted a sleeve 41. This sleeve 41 is so splined, like the sleeve 18 of the foregoing specific embodiment, to the outer ring 35 as to move back and forth in the axial directions. The sleeve 41 is provided with a helical gear 42 on the inner circumference of one end portion protruded in the axial direction. An arm portion 43 is so extended from the retainer 37 through the outer ring 35 to the inner circumference of the protrusion of the sleeve 41 as to mesh with that helical gear 42. In the outer ring 35, more specifically, there is formed a notch 44 which has a predetermined width in the circumferential direction. The arm portion 43 extends through the notch 44, and the retainer 37 can turn at a predetermined angle with the arm portion 43 with the range of the notch 44 together. On the outer circumference of the sleeve 41, moreover, there is formed an engagement portion 45 which acts as a manipulation portion for moving the sleeve 41 back and forth in the axial directions.

In the construction shown in FIG. 6, therefore, the two-way clutch 33 is connected to the gear 31 on the righthand side of FIG. 6, when the outer ring 35 is moved rightward of FIG. 6 to apply its positive clutch 38. In this state, the sleeve 41 is axially moved to set the retainer 37 and the rollers 36 either in the position "+" for transmitting the torque forward or in the position "−" for transmitting the torque backward. Thus, the gear 31 on the righthand side of FIG. 6 and the shaft 30 can be so connected forward or backward as to transmit the torque.

When the outer ring 35 is moved leftward of FIG. 6 to apply the positive clutch 39, on the contrary, it is disconnected from the gear 31 on the righthand side of FIG. 6 but is connected to the gear 32 on the lefthand side of FIG. 6. In this state, the sleeve 41 is axially moved to set the retainer 37 and the rollers 36 either in the position "+" for transmitting the torque forward or in the position "−" for transmitting the torque backward. Thus, the gear 32 on the lefthand side of FIG. 6 and the shaft 30 can be so connected forward or backward as to transmit the torque.

Thus according to the mechanism shown in FIG. 6, one two-way clutch 33 can be used as both a clutch for connecting the gear 31 on the righthand side of FIG. 6 to the shaft 30, and a clutch for connecting the gear 32 on the lefthand side of FIG. 6 to the shaft 30. It is, therefore, possible to reduce the number of two-way clutches to about one half of that of the gear pairs for setting the gear stages thereby to make the transmission small and light at a low cost.

Figure 7:
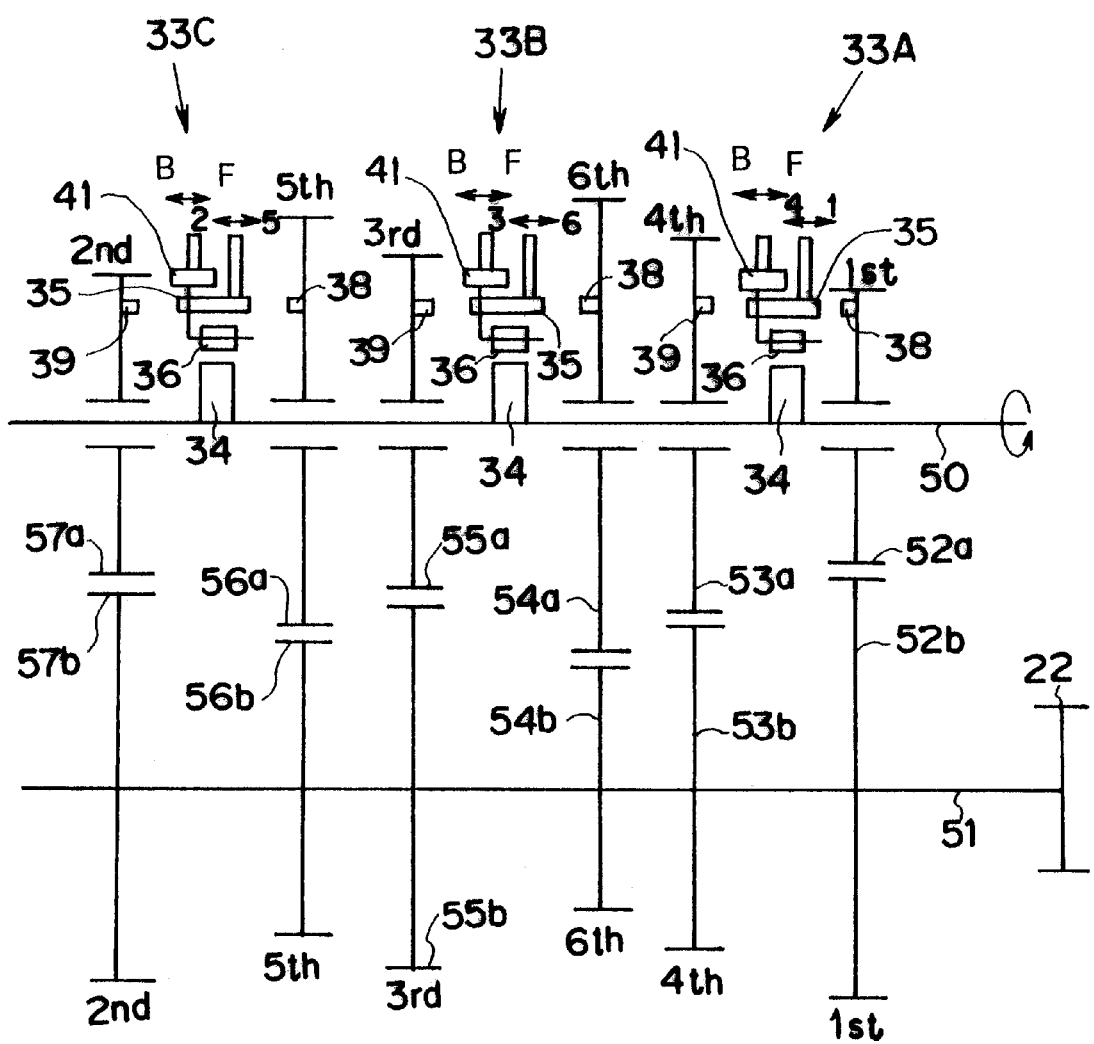
FIG. 7 is a skeleton diagram showing another embodiment of the transmission having six forward stages using the selective coupling mechanism.

FIG. 7 shows one embodiment of a 6-speed transmission adopting the aforementioned mechanism shown in FIG. 6. Between an input shaft 50 and an output shaft 51 arranged in parallel with each other, more specifically, there are interposed 1st-speed gear pairs 52a and 52b, 2nd-speed gear pairs 53a and 53b, 3rd-speed gear pairs 54a and 54b, 4th-speed gear pairs 55a and 55b, 5th-speed gear pairs 56a and 56b and 6th-speed gear pairs 57a and 57b, which have different gear ratios. These gear pairs are arranged sequentially for the 1st speed, 4th speed, 6th speed, 3rd speed, 5th speed and 2nd speed from the righthand side of FIG. 7. In short, the gear pairs being apart from each other for two or more gear stages (i.e., gear pairs being apart for three gear stages) are arrayed adjacent to each other. Of the individual gear pairs, moreover, the drive gears 52a, 53a, 54a, 55a, 56a and 57a are rotatably mounted on the input shaft 50, and the driven gears 52b, 53b, 54b, 55b, 56b and 57b are so mounted on the output shaft 51 as to rotate together. Moreover, two-way clutches 33A, 33B and 33C, as provided with the so-called "change-over mechanism" shown in FIG. 6, are arranged, respectively, between the 1st-speed drive gear 52a and the adjoining 4th-seed drive gear 55a, between the 6th-speed drive gear 57a and the adjoining 3rd-speed drive gear 54a, and between the 5th-speed drive gear 56a and the adjoining 2nd-speed drive gear 53a.

The transmission shown in FIG. 7 is enabled to set six forward gear stages by having the six gear pairs (i.e., the transmission mechanisms of the invention) of the 1st-speed gear pairs 52a and 52b to the 6th-speed gear pairs 57a and 57b. FIG. 8 is a diagram tabulating the positions of the outer ring 35, the retainer 37 and the rollers 36 in the individual two-way clutches 33A, 33B and 33C for setting those gear stages. In FIG. 8, the numerical values in the individual outer ring columns indicate the drive gear, to which the outer ring is connected. For example, "1st" indicates that the outer ring engages with the 1st-speed drive gear 52a. On the other hand, the letters "F" and "B" in the "roller" columns indicate the positions of the retainer and the rollers for determining the torque transmitting direction. The position "F" corresponds to the aforementioned position "+" indicating the positions of the retainer and the rollers for transmitting the torque when the inner ring, or the drive side member, rotates forward relative to the outer ring or the driven side member. On the other hand, the position "B" corresponds to the aforementioned position "−" indicating the positions of the retainer and the rollers for transmitting the torque when the inner ring or the drive side member, rotates backward relative to the outer ring or the driven side member.

The individual gear stages will be briefly described. When the 1st speed is to be set: the outer ring in the first two-way clutch 33A is brought into engagement with the 1st-speed drive gear 52a, and the rollers are positioned to transmit the torque forward; the outer ring in the second two-way clutch 33B is brought into engagement with the 3rd-speed drive gear 54a, and the rollers are positioned to transmit the torque backward; and the outer ring in the third two-way clutch 33C is brought into engagement with the 2nd-speed drive gear 53a, and the rollers are positioned to transmit the torque backward. As a result, the 1st-speed drive gear 52a is connected through the first two-way clutch 33A to the input shaft 50 so that the 1st speed at the gear ratio corresponding to that of the 1st-speed gear pairs 52a and 52b is set.

When the positions of the retainer and the rollers in the third two-way clutch 33C are switched from this state to those in the direction to transmit the torque forward, the torque is transmitted through the third two-way clutch 33C, and the first two-way clutch 33A is automatically released in response to the change in the torque. As a result, the torque is transmitted through the third two-way clutch 33C and the 2nd-speed gear pairs 53a and 53b from the input shaft 50 to the output shaft 51 thereby to set the 2nd speed at the gear ratio corresponding to that of the 2nd-speed gear pairs 53a and 53b.

When the positions of the retainer and the rollers in the second two-way clutch 33B are switched, in the set state of the 2nd speed, to those in the direction to transmit the torque forward, the torque is transmitted through the second two-way clutch 33B, and the third two-way clutch 33C is automatically released in response to the change in the torque. As a result, the torque is transmitted through the second two-way clutch 33B and the 3rd-speed gear pairs 54a and 54b from the input shaft 50 to the output shaft 51 thereby to set the 3rd speed at the gear ratio corresponding to that of the 3rd-speed gear pairs 54a and 54b. In this state of the 3rd speed, the outer ring in the first two-way clutch 33A is brought into engagement with the 4th-speed drive gear 55a, and the positions of the retainer and the rollers are set in the position to transmit the torque backward. In short, preparations are made for setting the 4th speed.

When the positions of the retainer and the rollers in the first two-way clutch 33A are switched in this state to those in the direction to transmit the torque forward, the torque is transmitted through the first two-way clutch 33A, and the second two-way clutch 33B is automatically released in response to the change in the torque. As a result, the torque is transmitted through the first two-way clutch 33A and the 4th-speed gear pairs 55a and 55b from the input shaft 50 to the output shaft 51 thereby to set the 4th speed at the gear ratio corresponding to that of the 4th-speed gear pairs 55a and 55b. In this state of the 4th speed, the outer ring in the 3rd two-way clutch 33C is brought into engagement with the 5th-speed drive gear 56a, and the positions of the retainer and the rollers are set in the position to transmit the torque backward. In short, preparations are made for setting the 5th speed.

When the positions of the retainer and the rollers in the third two-way clutch 33C are switched, in this state of the 4th speed, to those in the direction to transmit the torque forward, the torque is transmitted through the third two-way clutch 33C, and the first two-way clutch 33A is automatically released in response to the change in the torque. As a result, the torque is transmitted through the third two-way clutch 33C and the 5th-speed gear pairs 56a and 56b from the input shaft 50 to the output shaft 51 thereby to set the 5th speed at the gear ratio corresponding to that of the 5th-speed gear pairs 56a and 56b. In this state of the 5th speed, the outer ring in the second two-way clutch 33B is brought into engagement with the 6th-speed drive gear 57a, and the positions of the retainer and the rollers are set in the position to transmit the torque backward. In short, preparations are made for setting the 6th speed.

When the positions of the retainer and the rollers in the second two-way clutch 33B are switched in this state of the 5th speed having prepared for the 6th speed to those in the direction to transmit the torque forward, the torque is transmitted through the second two-way clutch 33B, and the third two-way clutch 33C is automatically released in response to the change in the torque. As a result, the torque is transmitted through the second two-way clutch 33B and the 6th-speed gear pairs 57a and 57b from the input shaft 50 to the output shaft 51 thereby to set the 6th speed at the gear ratio corresponding to that of the 6th-speed gear pairs 57a and 57b.

Here in the case of a downshift, there may be done the operations which are reversed from the aforementioned switching operations. When the engine brake is to be effected at each gear stage, on the other hand, the positions of the retainer and the rollers, which are transmitting the torque in the drive state, of the two-way clutch are reversed from the position "F" to the position "B" thereby to make a switching to the state for setting the gear stage lower by one speed.

Therefore, even the transmission having the construction shown in FIG. 7 can execute the gear changes without any interruption of the power while requiring no power such as a hydraulic pressure for setting/keeping the gear stage, thereby to prevent the power loss. In addition, there are provided six gear pairs or transmission mechanisms according to the number of gear stages, but the two-way clutches to be provided are sufficed by a half number or three sets. Therefore, the required number of two-way clutches required can be suppressed to provide a small/light transmission at a low cost.

Here, in the embodiment shown in FIG. 7, the two-way clutches are arranged between the input shaft and the drive gears. Alternatively, the construction can be modified such that the two-way clutches are arranged between the driven gears and the output shaft.

In the two-way clutch 33 having the construction shown in FIG. 6, the outer ring 35 moves back and forth in the axial directions so that the detent mechanism for retaining the sleeve 41 in the predetermined position cannot be interposed between the sleeve 41 and the outer ring 35. In this case, therefore, there may be provided a movable member 60 which has a construction shown in FIGS. 9A and 9B. This movable member 60 is a plate- or block-shaped member which can move back and forth in the axial directions through the retainer 37. This movable member 60 is formed at one side face on its leading side into a flat face which is displaced in one circumferential direction with respect to the center line along the axis and extended in the axial direction. The portion extending from that flat face is formed into such a slope as is gradually retracted therefrom in the circumferential direction at the rear end side. The other side face on the rear end side is formed into such a flat face as is displaced in the other circumferential direction with respect to the center line along the axis and extended along the axial direction. The portion extending from this flat face is formed into such a slope as is gradually retracted therefrom on the rear end side with respect to the circumferential direction. After all, this movable member 60 is formed into a point-symmetric shape, as seen in a top plan view in FIGS. 9A and 9B.

Moreover, an opening 37A for allowing the movable member 60 to pass through the retainer 37 has a width set substantially to that of the movable member 60. On the rear end side of the movable member 60, there is arranged a push member 61 which can move back and forth in the axial directions. An elastic member 62 is arranged between the push member 61 and the movable member 60. In other words, the pushing force and pulling force by the push member 61 are transmitted through the elastic member 62 to the movable member 60.

FIG. 9A shows the state in which the movable member 60 is moved to the front end, and FIG. 9B shows the state in which the movable member 60 is moved to the rear end. In either of these cases, the edge of the opening 37A of the retainer 37 is in abutment against the flat face portion of the leading or trailing end side of the movable member 60. This movable member 60 is allowed to move back and forth only in the axial directions of the retainer 37, and its flat face portion confronts in the circumferential direction. Even the pushing force acts from the retainer 37 on the movable member 60, therefore, this movable member 60 is not subjected to a load to move it axially so that the movable member 60 and the retainer 37 are fixed in predetermined positions shown in FIGS. 9A and 9B. In short, these individual flat face portions provide a retaining face 60A in the invention.

When the push member 61 is advanced from the state shown in FIG. 9A to move the movable member 60 leftward of FIG. 9A, for example, the slope, being opposite with respect to the retaining face 60A abutting against the edge of the opening 37A of the retainer 37, comes into contact with the other edge of the opening 37A, so that the slope pushes the retainer 37 circumferentially through the contacting edge as the movable member 60 advances farther. As a result, the retainer 37 and the rollers 36 retained by the former move in the circumferential direction with respect to the outer ring 35 in accordance with the advance of the movable member 60, thereby to reverse the torque transmitting direction in the two-way clutch 33.

If the mechanism shown in FIGS. 9A and 9B is used, therefore, the retainer and the rollers can be retained in the positions for setting the predetermined torque transmitting direction, without using any special detent mechanism. As a result, it is possible to simplify the entire construction as the transmission. In addition, the movable member to rotate with the retainer, the push member and the manipulation member for moving the former members back and forth need not be always held in contact, so that any unnecessary friction or wear can be avoided.

Here will be described the relations between the invention and the foregoing specific embodiments. The individual gear pairs arranged between the input shaft and the output shaft correspond to the transmission mechanism in the invention. The sleeves 18 and 41 for turning the retainers of the two-way clutches in the circumferential direction and the movable member 60, correspond to the select mechanism of the invention. Especially, the sleeve 18 shown in FIGS. 5A and 5B corresponds to the movable member in the invention. Moreover, the positive clutches 38 and 39 formed on the side faces of the outer ring 35 and the gears 31 and 32, as shown in FIG. 6, correspond to the selective coupling mechanism. Still moreover, the movable member 60 shown in FIGS. 9A and 9B corresponds to the movable member in the invention.

Here, in the foregoing specific embodiments, the transmission mechanisms having the different gear ratios are constructed of the gear pairs. However, the invention should not be limited to those specific embodiments. The transmission mechanisms of the different gear ratios can be constructed of friction wheels, belt transmission mechanisms, fluid transmission mechanisms, or transmission mechanisms using a viscous fluid. On the other hand, the invention should not have its application limited to the vehicular transmission using the engine as the prime mover but could also be applied to a transmission of an electric car using a motor as the prime mover, or a hybrid car using an engine and a motor as the prime mover.

Here will be synthetically described the advantages which can be obtained by the invention. According to the invention, as has been described hereinbefore, the two-way clutch for the predetermined transmission mechanism is set in the state to transmit the torque forward. If an upshift is done from this state, that is, if the torque is transmitted between the input shaft and the output shaft through the transmission mechanism having a small gear ratio, the two-way clutch having been applied till then is released in response to the change in the torque so that a gear change can be achieved. Specifically, the gear change is achieved by the change in the torque without any interruption of the power. As a result, it is possible to improve the riding comfortableness and the drivability of the vehicle. On the other hand, the two-way clutch keeps its applied state in accordance with the acting direction of the torque thereby to prevent the power from being consumed for keeping the gear ratio.

According to the invention, on the other hand, in addition to the foregoing advantages, the aforementioned change-over mechanism is moved forward or backward in the axial directions so that the retainer or the transmission members are turned by the predetermined angle. As a result, the torque transmitting direction in the two-way clutch is changed to achieve the gear change. Moreover, these movements in the axial direction are similar to those in the actions of the conventional manual transmission or semiautomatic transmission for switching the synchronizer. Therefore, the mechanism of the prior art for switching the synchronizer can be converted as the mechanism for the shifting operations. As a result, it is possible to lower the cost for manufacturing the transmission.

According to the invention, moreover, the movable member coupled to the retainer are retained at the first position and at the second position by the detent mechanism so that the retainer is retained in the position for transmitting the torque forward and in the position for transmitting the torque backward. After the retainer is set in either of the positions, therefore, it is unnecessary to apply the manipulation force continuously. As a result, it is possible to avoid the frictional contact between the movable member and the member for moving the former axially, thereby to prevent the power loss or the wear in advance.

According to the invention, still moreover, one predetermined two-way clutch is selectively coupled to the transmission mechanisms through the selective coupling mechanism so that it participates in the torque transmissions through those transmission mechanisms. Therefore, one two-way clutch can be commonly used among the transmission mechanisms. Therefore, it is possible to make the number of necessary two-way clutches less than that of transmission mechanisms, i.e., the number of gear ratios to be set, thereby to make the transmission smaller/lighter at a lower cost.

According to the invention, furthermore, the retaining face in the movable member for receiving the load from the retainer is a face opposed to the direction parallel to the tangential direction of the retainer, i.e., a face along the directions in parallel with the axial directions. Therefore, the load to move the movable member axially is not applied from the retainer to the movable member. Without any continuous application of the manipulation force to the movable member, therefore, the retainer can be retained in a predetermined position of the torque transmitting direction. Thus, the frictional contact between the movable member and the member for moving the former axially can be avoided to prevent the power loss and the wear in advance.

What is claimed is:

1. A transmission which has a first shaft, to which a power is transmitted from a prime mover; a second shaft for outputting the power to drive wheels; and a plurality of transmission mechanisms of different gear ratios for transmitting the power between said first shaft and said second shaft, comprising:

at least two two-way clutches, one of the two-way clutches located on the first shaft and interposed between one of said transmission mechanisms and said first shaft for switching a torque transmitting direction into a forward direction and a backward direction, and another of the two-way clutches located on the second shaft and interposed between another of the transmission mechanisms and the second shaft for switching a torque transmitting direction into a forward direction and a backward direction; and a plurality of select mechanisms for selectively setting the torque transmitting direction of said two-way clutches to the forward direction and the backward direction.

2. A transmission according to claim 1, wherein said each two-way clutch includes: an inner ring; an outer ring; a transmission member arranged between said inner ring and said outer ring for intermediating the torque transmission between said inner ring and said outer ring; and a retainer for retaining said transmission member and for turning relative to said inner ring or said outer ring to switch the torque transmitting direction, and wherein said each select mechanism includes a change-over mechanism for moving axially of said two-way clutch to turn said retainer relative to said inner ring or said outer ring.

3. A transmission according to claim 2, wherein said change-over mechanism includes: a movable member for moving said retainer to a position for transmitting the torque forward and a position for transmitting the torque backward; and a detent mechanism for retaining said movable member selectively in a first position to retain said retainer in said position for transmitting the torque forward and in a second position to retain said retainer in said position for transmitting the torque backward.

4. A transmission according to claim 1, further comprising:

a selective coupling mechanism for coupling/decoupling said two-way clutch and said at least any of said transmission mechanisms selectively.

5. A transmission according to claim 2, wherein said change-over mechanism includes a movable member made movable in the axial directions for moving said retainer to the position for transmitting the torque forward and the position for transmitting the torque backward, and wherein said movable member has a retaining face on which the load to be received from said retainer is in parallel with the tangential direction of said retainer when said retainer is retained in any of said positions.

6. A transmission according to claim 2, further comprising:

a selective coupling mechanism for coupling/decoupling said two-way clutch and said at least any of said transmission mechanisms selectively.

7. A transmission according to claim 3, further comprising:

selective coupling mechanisms for coupling/decoupling said two-way clutches and any of said transmission mechanisms selectively.

8. A transmission according to claim 1, wherein said at least any of said transmission mechanisms includes a plurality of gear pairs each having a drive gear and a driven gear always meshing with each other.

9. A transmission which has a first shaft, to which a power is transmitted from a prime mover; a second shaft for outputting the power to drive wheels; and a plurality of transmission mechanisms of different gear ratios for transmitting the power between said first shaft and said second shaft, comprising:

a two-way clutch having an outer ring, a transmission member arranged between an inner ring and said outer ring for intermediating the torque transmission between said inner ring and said outer ring and a retainer for retaining said transmission member and for turning relative to said inner ring or said outer ring to switch the torque transmitting direction, and interposed between at least any of said transmission mechanisms and said first shaft or said second shaft for switching a torque transmitting direction into a forward direction and a backward direction; and a change-over mechanism having a movable member for moving said retainer to a position for transmitting the torque forward and a position for transmitting the torque backward and a detent mechanism for retaining said movable member selectively in a first position to retain said retainer in said position for transmitting the torque forward and in a second position to retain said retainer in said position for the torque backward, the detent mechanism having recesses formed at the first and second positions, an engagement member selectively engaged to the recesses, and an elastic member for pushing the engagement member to the recesses.

10. A transmission according to claim 9, further comprising:

a selective coupling mechanism for coupling/decoupling said two-way clutch and said at least any of said transmission mechanisms selectively.

11. A transmission which has a first shaft, to which a power is transmitted from a primer mover; a second shaft for outputting the power to drive wheels; and a plurality of transmission mechanisms of different gear ratios for transmitting the power between said first shaft and said second shaft, comprising:

a two-way clutch interposed between at least any of said transmission mechanisms and said first shaft or said second shaft for switching a torque transmitting direction into a forward direction and a backward direction; the two-way clutch including an inner ring; an outer ring; a transmission member arranged between said inner ring and said outer ring for intermediating the torque transmission between said inner ring and said outer ring; and a retainer for retaining said transmission member and for turning relative to said inner ring or said outer ring to switch the torque transmitting direction; and a select mechanism for selectively setting the torque transmitting direction of said two-way clutch to the forward direction and the backward direction, including a change-over mechanism for moving axially of said two-way clutch to turn said retainer relative to said inner ring or said outer ring.

12. A transmission according to claim 11, wherein said change-over mechanism includes: a movable member for moving said retainer to a position for transmitting the torque forward and a position for transmitting the torque backward; and a detent mechanism for retaining said movable member selectively in a first position to retain said retainer in said position for transmitting the torque forward and in a second position to retain said retainer in said position for transmitting the torque backward.

13. A transmission according to claim 11:

wherein said change-over mechanism includes: a movable member made movable in the axial directions for moving said retainer to the position for transmitting the torque forward and the position for transmitting the torque backward, and wherein said movable member has a retaining face on which the load to be received from said retainer is in parallel with the tangential direction of said retainer when said retainer is retained in any of said positions.

14. A transmission according to claim 11, further comprising:

a selective coupling mechanism for coupling/decoupling said two-way clutch and said at least any of said transmission mechanisms selectively.

15. A transmission according to claim 12, further comprising:

a selective coupling mechanism for coupling/decoupling said two-way clutch and said at least any of said transmission mechanisms selectively.

16. A transmission according to claim 11, wherein said at least any of said transmission mechanisms includes a plurality of gear pairs each having a drive gear and a driven gear always meshing with each other.

* * * * *

UNITED STATES PATENT AND TRADEMARK OFFICE
CERTIFICATE OF CORRECTION

PATENT NO.     : 6,619,151 B2
DATED          : September 16, 2003
INVENTOR(S)    : Hiroyuki Shioiri It is certified that error appears in the above-identified patent and that said Letters Patent is hereby corrected as shown below:

<u>Column 17,</u>
Line 12, change "position for the torque" to -- position for transmitting the torque --.

Signed and Sealed this

Thirteenth Day of July, 2004

JON W. DUDAS
*Acting Director of the United States Patent and Trademark Office*